United States Patent Office

3,133,026
Patented May 12, 1964

3,133,026
METHOD FOR REMOVING CUPROUS SULFIDE SEGREGATIONS FROM THE SURFACE OF ELECTROLUMINESCENT PHOSPHORS
Willi Lehmann, Livingston, N.J., assignor to Westinghouse Electric Corporation, East Pittsburgh, Pa., a corporation of Pennsylvania
No Drawing. Filed Nov. 10, 1961, Ser. No. 151,453
2 Claims. (Cl. 252—301.6)

This invention relates to electroluminescence and, more particularly, to a method for processing electroluminescent phosphor and the resulting phosphor composition.

Electroluminescent phosphors are now well known. Such phosphors when placed within the influence of an alternating electric field are responsive to produce light. The most usual electroluminescent phosphors are copper-activated zinc sulfide types. A portion of the zinc sulfide matrix for the phosphor can be replaced by other group IIB metal sulfides, such as cadmium or mercuric sulfides. Also, a portion of the sulfur can be replaced by selenium to form so-called zinc sulfoselenide phosphors. Additional activators can be used to supplement the primary copper activator, in order to modify or shift the emission peak of electroluminescence, an example of such an additional activator being manganese.

When processing copper-activated zinc sulfide electroluminescent phosphors, it is necessary to place into the phosphor raw mix a considerable excess of copper over that which is ultimately retained in the phosphor. Apparently a portion of this excess copper forms cuprous sulfide segregations on and within the phosphor crystals in order to generate the intense electric fields which are required for good electroluminescent response. When such an excess of copper is placed into the raw mix, and the raw mix is fired to prepare the phosphor, the resulting fired material, while electroluminescent, has a dark body color which acts to absorb the generated light. In addition, cuprous sulfide has a relatively low electrical resistance and tends to shunt the applied electric field. In order to remove this excess cuprous sulfide, it has been the practice of the prior art to wash the fired phosphor in a solution which is a good solvent for cuprous sulfide, but which is not a good solvent for group IIB metal sulfides or selenides. Examples of such washing solutions are a slightly alkaline solution of a cyanide salt, such as sodium cyanide, or an acid solution of a thiosulfate or thiourea. While the resulting phosphors which have been processed with such a washing technique are very good with respect to electroluminescent performance, these washing procedures are relatively time consuming, expensive, and difficult to conduct on a production basis. In addition the washed phosphor must be water rinsed and then dried completely, since moisture is known to be deleterious to electroluminescent phosphors.

It is the general object of this invention to provide a simple, inexpensive method for processing fired, finely divided, copper-activated zinc-sulfide type electroluminescent phosphor.

It is another object to provide a method for processing electroluminescent phosphor wherein the phosphor is maintained in a dry condition at all times.

It is further object to provide an electroluminescent phosphor which has been processed in accordance with an improved method.

The aforesaid objects of the invention, and other objects which will become apparent as the description proceeds, are achieved by providing an improved method for processing zinc-sulfide-type electroluminescent phosphor which includes copper as activator. There is also provided the resulting phosphor. In accordance with the present invention, the fired, finely divided phosphor is exposed for a period of at least one minute to an atmosphere consisting essentially of elemental iodine maintained at a temperature of from 25° C. to 200° C., with the lower the temperature of the iodine atmosphere within this range, the longer the exposure time. This elemental iodine atmosphere serves to convert cuprous sulfide segregations on the phosphor surface portions to cuprous iodide. Cuprous iodide is colorless so that it does not absorb light which is generated by the phosphor. Thereafter, the phosphor is exposed for a period of at least 30 minutes to an iodine-free atmosphere which is maintained at a temperature of from 25° C. to 200° C., with the lower the temperature of the iodine-free atmosphere within this range, the longer the exposure time. This causes any excess iodine which remains on the phosphor particles to be volatilized.

The present invention is applicable to any fired, finely divided electroluminescent phosphor having a matrix principally comprising zinc sulfide and including copper as activator. As indicated hereinbefore, the best electroluminescent phosphors are copper-activated zinc sulfide and a part of the zinc sulfide can be replaced by other group IIB metal sulfides or by selenides. In addition, other activator materials can be used to supplement the copper, in order to modify the emission characteristics of the phosphor. Such phosphors are generally well known and a zinc-cadmium-mercuric sulfide phosphor is disclosed in copending application S.N. 82,117, filed January 11, 1961, and owned by the present assignee.

As a specific example, copper-activated zinc sulfide electroluminescent phosphor is prepared by mixing one thousand grams of zinc sulfide with 30 grams of elemental sulfur, 0.5 grams of copper acetate and 0.4 gram of ammonium chloride. This raw mix is fired at 950° C. in a partially closed container placed within a nitrogen atmosphere for 100 minutes. Thereafter, the phosphor desirably is lightly crushed, 3 grams of sulfur are added to the crushed material and it is refired, as in the initial firing step. The fired phosphor is then crushed to the status of a fine powder and sifted so that it passes a 325 mesh sieve. The state of division of this finely divided phosphor is not critical and is subject to considerable variation.

In accordance with the present invention, a small amount of elemental iodine is mechanically mixed with the fired, finely divided phosphor. As a specific example, 2% by weight of elemental iodine is added to the phosphor and this amount of iodine is subject to considerable variation, since only a very small amount of iodine is required to convert the cuprous sulfide to cuprous iodide, and excessive iodine is not harmful. The phosphor and mixed iodine are placed in a tray with a loosely fitting cover. The phosphor and mixed elemental iodine are then exposed for a period of at least one minute to a temperature of from 25° C. to 200° C. At the lower end of the temperature range, a considerably prolonged exposure period is required, such as twenty-four hours. At the upper end of the temperature range, the iodine volatilizes and reacts very rapidly and a heating period of one minute will be sufficient to convert excess cuprous sulfide to cuprous iodide and lighten the body color of the phosphor. Thus the lower the temperature of the iodine-containing atmosphere within the foregoing range, the longer the exposure time. As a specific example, the heating container is maintained at a temperature of about 100° C. for about one hour. The iodine evaporates fairly readily at this temperature, in order to produce within the container an atmosphere which consists essentially of elemental iodine. The iodine vapor converts substantially all of the excess cuprous sulfide to cuprous iodide, without otherwise affecting the phosphor.

The cover is then removed from the heating container and the heating is continued for another hour at a temperature of 100° C., for example, in order to permit any excess, uncombined iodine to volatilize from the phosphor. This last heating in air is subject to considerable variation and the phosphor should be exposed to such an iodine-free atmosphere, maintained at a temperature of from 25° C. to 200° C., for a period of at least 30 minutes, with the lower the temperature of the iodine-free atmosphere within this range, the longer the exposure time. The preferred iodine-free atmosphere is air although other atmospheres such as nitrogen can be substituted therefor. The phosphor, after this final treatment step, is ready to be incorporated into an electroluminescent cell. Normally the phosphor will be embedded in a dielectric material and sandwiched between the operating electrodes of an electroluminescent cell, as is well known.

It is known that moisture has a deleterious effect on the performance of electroluminescent phosphor. When processing the electroluminescent phosphor in accordance with the practices of the prior art, wherein the excess cuprous sulfide was removed by an aqueous wash, it was necessary to dry the phosphor completely before it could be incorporated into an electroluminescent cell. Electroluminescent phosphor which is processed in accordance with the present invention, however, is maintained substantially dry at all times. The phosphor is modified slightly in that the excess cuprous sulfide is converted to cuprous iodide, instead of being removed therefrom. It should be noted, however, that cuprous iodide is colorless so that the body color of the phosphor is approximately the same as if the cuprous sulfide has been removed by a cyanide wash. In addition, while cuprous iodide is not an electrical insulator, it is a much poorer electrical conductor than cuprous sulfide, so that the residual cuprous iodide does not electrically shunt the phosphor particles to impair the electroluminescent performance. Accordingly, the electroluminescent brightness of the present phosphor is equal to that of a similar but cyanide-washed phosphor.

Under microscopic examination, the present phosphor will still display some dark cuprous sulfide segregations within the crystal lattice and a limited number of such segregations on or just below the surface of the crystal particles. However, a substantial portion of the dark, cuprous sulfide segregations originally included on the surface portion of the phosphor will have been converted to cuprous iodide to lighten the phosphor body color.

It will be recognized that the objects of the invention have been achieved by providing an improved method for processing electroluminescent phosphor, which method has the advantages of being relatively simple and cheap as well as eliminating the necessity of bringing the phosphor into contact with moisture, which is known to be deleterious to phosphor performance. There has also been provided the phosphor which has been processed in accordance with this improved method.

While a best example has been illustrated and described in detail, it is to be particularly understood that the invention is not limited thereto or thereby.

I claim as my invention:

1. The method of improving the electroluminescent response characteristics of fired, finely divided electroluminescent phosphor having a matrix principally comprising zinc sulfide and including copper as activator and having cuprous sulfide on the surface portions thereof, which method comprises, exposing the phosphor to an atmosphere consisting essentially of elemental iodine maintained at a temperature of from 25° C. to 200° C. for at least one minute and until cuprous sulfide on the surface of the phosphor converts to cuprous iodide, with the lower the temperature of the iodine atmosphere within the foregoing range, the longer the exposure time, and thereafter exposing the phosphor to an iodine-free atmosphere maintained at a temperature of from 25° C. to 200° C. for at least 30 minutes and until uncombined iodine volatilizes from the phosphor, with the lower the temperature of the iodine-free atmosphere within the foregoing range, the longer the exposure time.

2. The method of improving the electroluminescent response characteristics of fired, finely divided copper-activated zinc sulfide electroluminescent phosphor, which method comprises, exposing the phosphor for about 1 hour to an atmosphere consisting essentially of elemental iodine maintained at a temperature of about 100° C., and thereafter exposing the phosphor for about 1 hour to an air atmosphere maintained at a temperature of about 100° C.

References Cited in the file of this patent

UNITED STATES PATENTS

| | | |
|---|---|---|
| 2,847,386 | Mazo et al. | Aug. 12, 1958 |
| 2,980,627 | Swindells | Apr. 18, 1961 |